Figure 1:
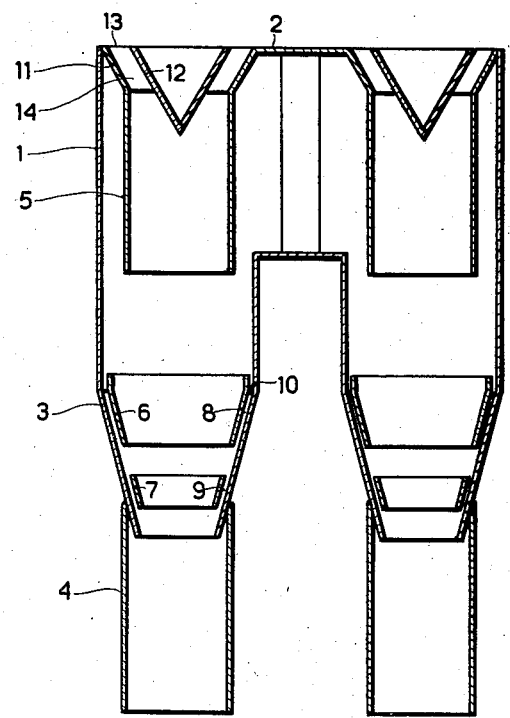

Nov. 20, 1951 S. W. WALLIN 2,575,607
CYCLONE SEPARATOR
Filed Nov. 10, 1948

INVENTOR
SVEN WERNER WALLIN
BY HIS ATTORNEYS
Howson & Howson

UNITED STATES PATENT OFFICE 2,575,607

CYCLONE SEPARATOR

Sven Werner Wallin, Jonkoping, Sweden, assignor to A. B. Svenska Flaktfabriken, Stockholm, Sweden Application November 10, 1948, Serial No. 59,270
In Sweden April 21, 1948

1 Claim. (Cl. 183—85)

The present invention relates to an arrangement in cyclones comprising a helical jacket having an inlet tube tangentially connected thereto, an end wall covering the upper end of said jacket, a cylindric or tapered outlet tube provided at the other end of the jacket, and a central tube extending through the end wall and arranged co-axially with the axis of the jacket.

One object of the invention is to provide an improved cyclone of said type for the purification of air or gases. Another essential object of the invention is to diminish the wear on the material of the cyclone, so that its working life increases, and in addition to improve the power of the cyclone to purify the air or gas and bring about a recovery of the pressure for the purified medium.

The arrangement according to the invention consists mainly in the feature that an annular member is located in the outlet tube slightly apart from its wall, so that an interstice is formed between the outer surface of the member and the inner surface of the outlet tube around the annular member. The annular member may in this case be shaped as the surface of the frustum of a cone preferably being concentrical with the surface of the outlet tube, which is cone-shaped at this point. In certain cases it may be convenient to divide the annular member into two or more annular elements provided inside the outlet tube and being axially spaced apart. The object of such arrangements is to provide an interstice between the inner surface of the outlet tube and the annular member or members, in which the coarser particles separated from the air or gas may be caught and by their friction against the walls get their falling speed reduced, and in this way reduce the wear of the walls while the particles simultaneously obtain a space in which they may fall down towards the outlet and be evacuated without being caught by the turbulent gas or air again.

It is another feature of the invention that the annular space between the central tube and the jacket of the cyclone is shaped in such a manner that this space will successively decrease in width towards the end wall. By this arrangement the possibilities of turbulent movement of the air or gas at the end wall are decreased and the wear on the end wall and the adjacent walls is diminished.

A third feature is that the central tube is shaped so that it expands conically at the outlet through the end wall, a recovery of the pressure on the escaping gas or air being obtained in this way. According to a special embodiment of the invention a conical body may in this case be provided in said enlarged portion of the central tube.

Figure 2:
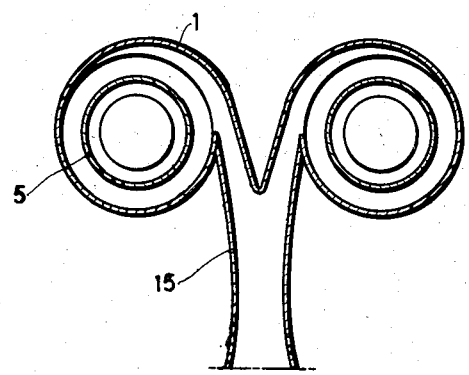

The invention will be more clearly understood by the following description of an example with reference to the accompanying drawing in which Figure 1 shows a vertical section through a double cyclone for the purification of flue gases, and Fig. 2 is a horizontal section of Fig. 1.

In the drawing I designates the helical jacket of a cyclone, while 2 is the upper end wall, 3 the tapered outlet tube to which a tube 4 is connected, and 5 the central tube located within the jacket I and being concentrical with its axis. In the conical part of the outlet tube 3 are provided two annular members 6 and 7. These members leave an annular space 8 and 9, respectively, between the inner surface of the tube 3 and the outer surface of the members 6 and 7. The annular members 6 and 7 are attached to the tube 3 by means of radial stays 10 or the like.

The upper portion of the central tube 5 is shaped into an outwardly divergent outlet 11 connected to the end walls 2. In the outlet 11 there is placed a conical body 12 supported by radial stays 13. Between the body 12 and the outlet 11 there is an annular chamber 14 the cross section of which increases towards the outlet for the purified medium.

In the example here shown the inlet tube for the gas or air to be purified is designated by 15. This tube is common for the two cyclones, as will be seen by the figure, and has a tangential inlet to the jacket I of the cyclone in question.

The gas to be purified enters through the tube 15 and sweeps along the walls of the jacket I. Due to the centrifugal force the heavy contaminations are accumulated adjacent to the wall of the jacket and when the rotating gas flow reaches down to the member 6, the heavy particles pass into the space 8, where their speed is reduced by friction, the particles then falling down towards the outlet while passing through the space 9.

The tube 4 leads to a container (not shown) where the particles are gathered. The purified gas which accumulates in the centre of the jacket I, escapes through the central tube 5 and the slot 14, and in passing said slot it recovers some of its pressure.

In the space between the central tube 5 and the jacket 1 is formed an upright whirl, when the cyclone is working, having a direction of motion along the inner surface of the jacket 1 towards the end wall 2, where it turns and passes down along the outer surface of the central tube 5 then turning again and flowing up at the inner surface of the jacket 1. This whirl has a strongly wearing effect on the end wall 2, as it has been proved that the contaminations from the gas or air have a tendency to accumulate beneath the end wall and to move in the direction of the whirl thus wearing the wall. By making said space so that its width successively decreases towards the end wall 2 in accordance with the invention, the whirl is prevented from being formed, and in this way the wear is reduced.

Having now described my invention, what I claim as new, and desire to secure by United States Letters Patent, is:

In a cyclone, a jacket having an inlet tube tangentially connected thereto, said jacket having a helical wall portion extending from said inlet through approximately one-half of the circumference of the jacket, a closure for one end of said jacket, a central tube in said jacket opening through said closure and arranged coaxially with respect to the axis of the jacket, said central tube having an outwardly divergent conical outlet portion adjacent said closure, a tapered outlet tube connected to and communicating with the other end of said jacket, and a plurality of frusto-conical annular members mounted coaxially in said tapered outlet tube and spaced uniformly from the wall thereof, two of said annular members being disposed respectively at the junction of the jacket and the tapered outlet tube and at the discharge end of the latter to constitute virtual wall members therein providing free annular passages below and between said members for the flow of cleansed air to the central tube as the particles are separated therefrom.

SVEN WERNER WALLIN.

REFERENCES CITED

The following references are of record in the file of this patent:

UNITED STATES PATENTS

| Number | Name | Date |
|---|---|---|
| 466,962 | Hunter | Jan. 12, 1892 |
| 1,239,456 | Brantingham et al., | Sept. 11, 1917 |
| 1,708,697 | Jensen | Apr. 9, 1929 |
| 2,067,710 | Jacobsen | Jan. 12, 1937 |
| 2,155,911 | Shaw | Apr. 25, 1939 |
| 2,289,329 | Prickett | July 7, 1942 |

FOREIGN PATENTS

| Number | Country | Date |
|---|---|---|
| 406,036 | Great Britain | Feb. 19, 1934 |